No. 881,291. PATENTED MAR. 10, 1908.
J. C. BELL.
COMMERCIAL PAPER.
APPLICATION FILED APR. 19, 1906.
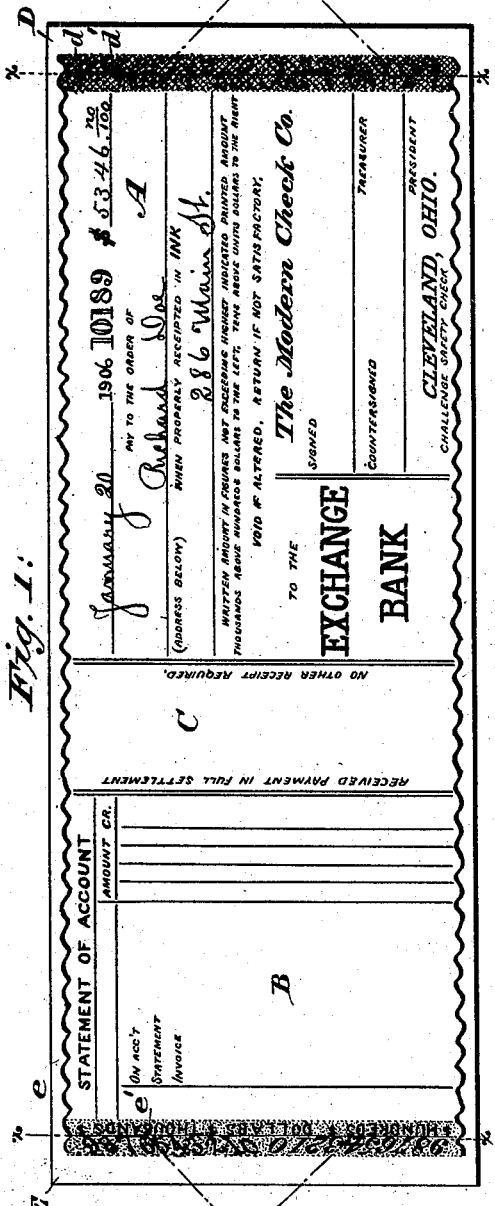
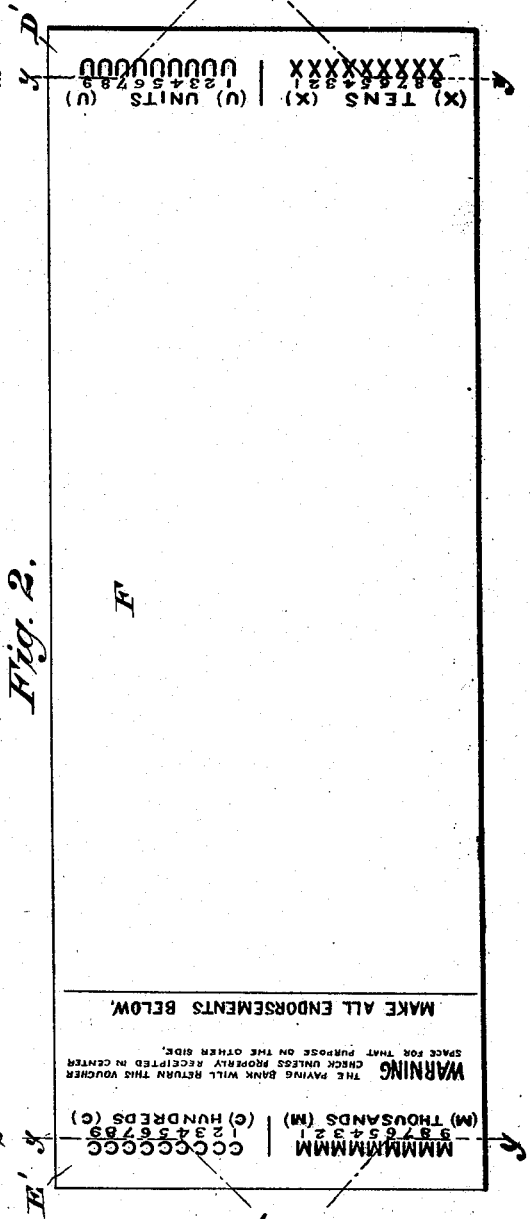
WITNESSES:
INVENTOR:
John C. Bell
by his attorney
J. B. Fay.

UNITED STATES PATENT OFFICE.

JOHN C. BELL, OF CLEVELAND, OHIO.

COMMERCIAL PAPER.

No. 881,291.  Specification of Letters Patent.  Patented March 10, 1908.

Application filed April 19, 1906. Serial No. 312,521.

*To all whom it may concern:*

Be it known that I, JOHN C. BELL, a citizen of the United States, resident of Cleveland, county of Cuyahoga, and State of Ohio, have invented a new and useful Improvement in Commercial Papers, of which the following is a specification, the principle of the invention being herein explained and the best mode in which I have contemplated applying that principle so as to distinguish it from other inventions.

My invention relates to an improvement in commercial papers, and especially to the combination with a check, of certain forms and elements imparting thereto features of safety and convenience hereinafter fully described and specifically set forth in the claims.

The annexed drawing and the following description set forth in detail certain means embodying the invention, said disclosed means constituting but one of various forms in which the principle of the invention may be used.

In said annexed drawing: Figure 1 represents a front or face view of a check embodying the features of my invention, and Fig. 2 represents a rear or back view thereof.

As plainly shown in the drawing, the front of the check comprises a check portion proper A, a portion for a statement of account B, a space C in which a receipt may be inserted, and two end-portions D and E, hereinafter to be more fully described. The rear of the check shown in Fig. 2 comprises two end-portions D' and E' coöperating in certain ways, as will be fully described later, with the front end-portions D and E; and the large blank intermediate portion F at the left hand end of which suitable indorsements may be made. Referring to the front of the check-portion proper A, the same involves no essentially new features with the exception that provision is made for the insertion of the amount for which the check is drawn in figures only, and a warning referring to the safety features of the check embodied in the two end-portions D and E thereof. The statement of account space B can be utilized in any desirable or convenient way, and, as a feature of bookkeeping, will be found to be quite a saving of time, for designating the articles for which the check is a payment, or a reference as to the accounts into which the elements of the amount for which the check is drawn are distributed, and immediately to the right of said statement of account B and in the space C is a convenient and natural place in which the drawee may receipt for full settlement of the invoice detailed in said statement of account. The essence of my invention, however, aside from the convenience, economy, and the saving of time entailed in its use, resides in its safety features, which are provided for in the front and rear end-sections D and E, and D' and E', respectively. Upon the front end-sections D and E are placed any suitable backgrounds $d$ and $e$ of different colors, or differing in any other desired way so as to make them entirely distinct one from the other. Said backgrounds are divided into two parts by vertical lines $d'$ and $e'$, respectively.

Upon the outer part of each background is arranged a vertical row of digits, as shown, each row comprising two series of figures, naught to nine inclusive, respectively, disposed symmetrically with respect to a central point, such figures being preferably arranged consecutively, commencing at the middle of the check and running toward the top and bottom thereof. As plainly shown in Fig. 1, these figures are arranged at an angle of about forty-five degrees, and the figures of one series from naught to nine are arranged at approximately a right angle to those of the other series. Just within the lines $d'$ and $e'$ and upon the other part of the background are placed the words "Units and ten", "Hundreds and thousands", upon the right and left-hand ends D and E, respectively, in each case associated with the word "Dollars" intermediate of the "Units and tens", and of the "Hundreds and thousands", respectively, the "Thousands" being placed above the "Hundreds" and the "Tens" above the "Units", and one of the four words being located adjacent respectively to the four series of digits.

It will be noted that the check shown in the drawing is drawn for five thousand three hundred and forty-six dollars ($5,346.00), so that, in utilizing my check, before it is issued, by any suitable cutting or tearing device it can be torn along the lines $x$—$x$, Fig. 1, by means of which it will be noted that the highest indicated printed amount will be five-thousand three hundred forty-six dollars, corresponding with the written amount in figures upon the check portion proper A and in accordance with the warning given upon said check portion. I shall now refer to the end-portions D' and E' upon the rear of the check, which comprise four series of characters, herein shown as a series of U's, a series of X's, a series of C's and a series of M's, associated each with a series of digits 1 to 9, and with the words "Units", "Tens", "Hundreds" and "Thousands", respectively, together with the letters "U", "X", "C" and "M" in parentheses, placed upon either side of the words "Units", "Tens", "Hundreds" and "Thousands", respectively, in order to more plainly and definitely point out each series and to reduce to a minimum the opportunity of making mistakes through haste, carelessness or inadvertence. When the check is drawn and torn as indicated by the lines x—x, Fig. 1, it will be torn upon the rear as shown by the lines y—y, Fig. 2. From an inspection of said Fig. 2 it will be noted that the bank teller can observe when he looks at the indorsement upon said check, that five M's are in evidence right before him, also three C's, four X's and six U's, associated with the figures 5, 3, 4, and 6, respectively, and with the words "Thousands", "Hundreds", "Tens" and "Units", respectively, all arranged so that at a glance, without turning the check about in any way, he can note whether or not the amount thus shown corresponds with the amount which he has observed upon the face of the check.

So far as the safety features of my check are concerned, the spirit of my invention comprehends a check upon which it is almost absolutely impossible to raise the amount for which it is drawn, and comprises the varying backgrounds and the two rows of figures differing in arrangement one from the other, but many departures from the actual construction which I have shown can be made without departing from the spirit of my invention. The coöperating feature upon the back of the check at either end is an element of safety greatly adding to the efficiency of the check and enabling the bank cashier or teller to confirm the amount for which it is drawn at every glance he gives the check, whether it be turned face or rear, vertically or horizontally.

It will be understood, of course, that I might dispense with one of the end-portions D or E, especially for checks which are drawn for smaller amounts than the one which I have shown and which might have a limit of $100.00 or $1,000.00 instead of the $10,000.00 limit of this check; and, furthermore, suitable means might be provided for detachably connecting the check to a stub, if it were desired to keep the checks in the usual book-form.

It will be readily apparent that no check punch or other protective device is needed other than a small cutting or tearing member which can be readily supplied; and that the combination of features which I have provided results in a voucher check which is very efficient, safe and economical.

Having thus described my invention in detail, that which I particularly point out and distinctly claim is:—

1. A check, or similar commercial paper, provided with a protective device consisting of two alined columns each made up of the digits naught to nine symmetrically disposed with respect to a central point; and designations of two orders of values disposed adjacent to said two alined columns respectively.

2. A check, or similar commercial paper, provided with a protective device consisting of two alined columns each made up of the digits naught to nine, the naughts being placed at the center and the nines at the respective ends of the combined column; and designations of two successive orders of values disposed adjacent to said two alined columns, respectively.

3. A check, or similar commercial paper, provided with a protective device consisting of two alined columns each made up of the digits naught to nine, the naughts being placed at the center and the nines at the respecive ends of the combined column, the individual figures of the respective columns being inclined so as to distinguish one column from the other; and designations of two successive orders of values disposed adjacent to said two alined columns respectively.

4. A check, or similar commercial paper, provided with a protective device consisting of two vertically disposed alined columns of the digits naught to nine at one end of the check, the naughts being placed at the center and the nines at the respective ends of the combined column, the individual figures of the upper column inclining upwardly and inwardly, and of the lower column, upwardly and outwardly, with respect to the end of the check; and designations of two successive orders of values disposed adjacent to the inner sides of said two alined columns, respectively, substantially as described.

5. A check, or similar commercial paper, provided with a protective device consisting of two vertically disposed alined columns of the digits naught to nine at each end of the check, the naughts being placed at the center and the nines at the respective ends of the two combined columns thus formed, the individual figures of the upper of each pair of alined columns inclining upwardly and inwardly, and of the lower, upwardly and outwardly, with respect to the corresponding end of the check; and designations of units and tens, hundreds and thousands, disposed in pairs as indicated adjacent to the inner sides of the pair of alined columns at each end of the check, substantaially as described.

6. A check, or similar commercial paper, provided with a protective device consisting of two vertically disposed alined columns of the digits naught to nine at each end of the face of the check, the naughts being placed at the center and the nines at the respective ends of the two combined columns thus formed, the individual figures of the upper of each pair of alined columns inclining upwardly and inwardly, and of the lower, upwardly and outwardly, with respect to the corresponding end of the check; designations of units and tens, hundreds and thousands, disposed in pairs as indicated adjacent to the inner sides of the pair of alined columns at each end of the check; a similar combined column of digits at each end of the back of the check together with similar designations disposed so that corresponding digits on the front and the back are superposed, substantially as described.

7. A check, or similar commercial paper, provided with a protective device consisting of two vertically disposed alined columns of the digits naught to nine at each end of the check, such ends of the check respectively forming different back-grounds for said columns, the naughts being placed at the center and the nines at the respective ends of the two combined columns thus formed, the individual figures of the upper of each pair of alined columns inclining upwardly and inwardly, and of the lower, upwardly and outwardly, with respect to the corresponding end of the check; and designations of units and tens, hundreds and thousands, disposed in pairs as indicated adjacent to the inner sides of the pair of alined columns at each end of the check, substantially as described.

Signed by me, this 11" day of April 1906.

JOHN C. BELL.

Attested by—
  Jno. F. Oberlin,
  G. W. Saywell.